US010834666B2

(12) United States Patent
Ryu (10) Patent No.: US 10,834,666 B2
(45) Date of Patent: Nov. 10, 2020

(54) WIRELESS COMMUNICATION DEVICE AND METHOD (71) Applicant: Allied Telesis Holdings K.K., Tokyo (JP)

(72) Inventor: Jaehyuk Ryu, Tokyo (JP)

(73) Assignee: Allied Telesis Holdings K.K., Tokyo (JP)

( * ) Notice: Subject to any disclaimer, the term of this patent is extended or adjusted under 35 U.S.C. 154(b) by 0 days.

(21) Appl. No.: 16/183,601

(22) Filed: Nov. 7, 2018

(65) Prior Publication Data

US 2019/0141621 A1 May 9, 2019

(30) Foreign Application Priority Data

Nov. 8, 2017 (JP) .................................. 2017-215662

(51) Int. Cl.
*H04W 48/16* (2009.01)
*H04L 29/12* (2006.01)
(Continued)

(52) U.S. Cl.
CPC ........... *H04W 48/16* (2013.01); *H04L 9/3226* (2013.01); *H04L 61/103* (2013.01);
(Continued)

(58) Field of Classification Search
CPC . H04L 9/3226; H04L 61/1511; H04L 61/103; H04L 61/6022; H04L 2209/80;
(Continued)

(56) References Cited

U.S. PATENT DOCUMENTS

| 7,874,483 B2 | 1/2011 | Wang et al. |
| 10,715,345 B2 | 7/2020 | Hanatani et al. |

(Continued)

FOREIGN PATENT DOCUMENTS

| CN | 104254110 A | 12/2014 |
| CN | 104935564 A | 9/2015 |

(Continued)

OTHER PUBLICATIONS

Jerom,e Henry, "802.11s Mesh Networking," Nov. 2011, Certified Wireless Network Professional, pp. 18-19, https://www.cwnp.com/uploads/802-11s_mesh_networking_v1-0.pdf.*

(Continued)

*Primary Examiner* — Maharishi V Khirodhar
*Assistant Examiner* — Kenneth P Hunt
(74) *Attorney, Agent, or Firm* — Haynes Beffel & Wolfeld LLP; Andrew L. Dunlap (57) ABSTRACT

According to the present disclosure, a wireless communication device wirelessly communicates with mesh portals in conformity with the IEEE 802.11s standard. The wireless communication device includes a MAC address receiving section, a MAC address recording section, an IP address inquiring section, and an IP address recording section. The MAC address receiving section receives the MAC addresses of the mesh portals from the mesh portals. The MAC address recording section records the received MAC addresses in correspondence to metrics between the mesh portals and the wireless communication device. The IP address inquiring section preferentially requests an IP address from one of the mesh portals having a MAC address corresponding to a smaller one of the metrics based on contents recorded by the MAC address recording section. The IP address recording section records the IP address transmitted from the mesh portal as a result of the request.

11 Claims, 11 Drawing Sheets

(51) Int. Cl.
*H04L 9/32* (2006.01)
*H04W 12/08* (2009.01)
*H04W 48/10* (2009.01)
*H04W 60/00* (2009.01)
*H04W 84/22* (2009.01)

(52) U.S. Cl.
CPC ......... *H04L 61/1511* (2013.01); *H04W 12/08* (2013.01); *H04W 60/00* (2013.01); *H04L 61/6022* (2013.01); *H04W 48/10* (2013.01); *H04W 84/22* (2013.01)

(58) Field of Classification Search
CPC . H04W 48/16; H04W 12/08; H04W 12/0013; H04W 60/00; H04W 84/22; H04W 48/10; H04W 84/12; H04W 84/18; H04W 84/20; H04W 48/17; H04W 48/18; H04W 48/20; H04W 48/14; H04W 76/104; H04W 4/20
See application file for complete search history.

(56) References Cited

U.S. PATENT DOCUMENTS

| | | | |
|---|---|---|---|
| 2005/0195795 A1* | 9/2005 | Aoki | H04W 40/02 370/351 |
| 2006/0253735 A1 | 11/2006 | Kwak et al. | |
| 2008/0063205 A1 | 3/2008 | Braskich et al. | |
| 2013/0265909 A1 | 10/2013 | Park et al. | |
| 2015/0139034 A1 | 5/2015 | Kang et al. | |
| 2015/0334629 A1 | 11/2015 | Palil et al. | |
| 2016/0073330 A1* | 3/2016 | Patil | H04L 61/2015 709/220 |
| 2017/0332439 A1* | 11/2017 | Savolainen | H04L 45/04 |
| 2018/0063714 A1* | 3/2018 | Stephenson | H04W 12/04 |

FOREIGN PATENT DOCUMENTS

| | | |
|---|---|---|
| CN | 105163349 A | 12/2015 |
| EP | 1872219 A4 | 9/2011 |
| JP | 2011-120257 A | 6/2011 |
| TW | 200704218 A | 1/2007 |
| TW | 200803283 A | 1/2008 |
| WO | 2006099134 A3 | 12/2007 |
| WO | 2014010087 A1 | 1/2014 |

OTHER PUBLICATIONS

TW 107131749—Office Action dated Aug. 19, 2019, 7 pages.
JP 2017-215662—Notice of Allowance (Machine Translation) dated Apr. 15, 2020, 2 pages.
JP 2017-215662—Notice of Reasons for Refusal (Machine Translation) dated Sep. 30, 2019, 8 pages.
Pisa, C et al, "The OLRS mDNS Extension for Service Discovery", Conference Paper, DOI: 10.1109/ SAHCNW.2009.5172965, IEEE Xplore, Jul. 2009, 4 pages.

* cited by examiner

| MAC Address | Metric |
|---|---|
| MAC Address of MPP12 | 3000 |
| MAC Address of MPP14 | 2300 |

WIRELESS COMMUNICATION DEVICE AND METHOD

CROSS-REFERENCE

This application claims priority to Japan Patent Office Application No. 2017-215662, entitled "WIRELESS COMMUNICATION DEVICE AND METHOD", filed on Nov. 8, 2017. The priority application is hereby incorporated by reference herein for all purposes.

BACKGROUND

The present disclosure relates to setting a mesh point and a mesh access point in a mesh network.

Mesh networks have conventionally been known to have a mesh portal, a mesh point, and a mesh access point (see JP 2011-120257 A, for example).

In order to allow the mesh point and the mesh access point to function as part of the mesh network, it is necessary to set the mesh point and the mesh access point together with the mesh portal.

It is noted that upon setting the mesh point and the mesh access point together with the mesh portal, it may be necessary to simultaneously operate their buttons for synchronization between the mesh point, the mesh access point and the mesh portal. This simultaneous operation of multiple buttons to set the meth point and the mesh access point together with the mesh portal is inconvenient and burdensome for a user who is setting up the mesh network.

SUMMARY

It is hence an object of the present disclosure to set a mesh point and a mesh access point easily.

According to the present disclosure, a wireless communication device that wirelessly communicates with mesh portals in conformity with the institute of electrical and electronic engineers (IEEE) 802.11s standard is provided. The wireless communication device may include: a media access control (MAC) address receiving section that receives, from the mesh portals, MAC addresses of the mesh portals; a MAC address recording section that records the received MAC addresses in correspondence to metrics between the mesh portals and the wireless communication device; an internet protocol (IP) address inquiring section that preferentially requests an IP address from one mesh portal of the mesh portals having a MAC address corresponding to a smaller one of the metrics based on contents recorded by the MAC address recording section; and an IP address recording section that records the IP address transmitted from the one mesh portal as a result of the request.

The thus constructed wireless communication device wirelessly communicates with mesh portals in conformity with the standard IEEE 802.11s. A MAC address receiving section receives the MAC addresses of the mesh portals from the mesh portals. A MAC address recording section records the received MAC addresses in correspondence to metrics between the mesh portals and the wireless communication device. An IP address inquiring section preferentially requests an IP address from one of the mesh portals having a MAC address corresponding to a smaller one of the metrics based on contents recorded by the MAC address recording section. An IP address recording section records the IP address transmitted from the mesh portal as a result of the request.

According to the wireless communication device of the present disclosure, the MAC address receiving section may receive the MAC addresses transmitted from the mesh portals by a broadcast root announcement (RANN).

According to the wireless communication device of the present disclosure, the IP address inquiring section may make a multicast domain name system (mDNS)-based inquiry.

According to the present disclosure, the wireless communication device may further include: a closed-mesh information requesting section that requests, via an open mesh, a group ID and a password for closed-mesh wireless communications from a mesh portal of the mesh portals; a closed-mesh information receiving section that receives, via the open mesh, an encrypted version of the group ID and an encrypted version of the password from the mesh portal from which the group ID and the password were requested; and a closed-mesh information recording section that records a decoded version of the encrypted group ID and the encrypted password, wherein the request by the closed-mesh information requesting section is encrypted.

According to the wireless communication device of the present disclosure, the encryption may be based on hypertext transfer protocol secure (HTTPS).

According to the present disclosure, the wireless communication device may further include: an identifier receiving section that receives, from a recording device and via the closed mesh, identifiers of wireless local area network (LAN) access points recorded by the recording device, wherein the recording device is connected with the mesh portals via a wired network, and wherein the group ID and the password recorded by the closed-mesh information recording section are used for wireless communications using the closed mesh.

According to the present disclosure, a wireless communication method of using a wireless communication device that wirelessly communicates with mesh portals in conformity with the IEEE 802.11s standard is provided. The wireless communication method may include: a MAC address receiving step of receiving the MAC addresses of the mesh portals from the mesh portals; a MAC address recording step of recording the received MAC addresses in correspondence to metrics between the mesh portals and the wireless communication device; an IP address inquiring step of preferentially requesting an IP address from one mesh portal of the mesh portals having a MAC address corresponding to a smaller one of the metrics based on contents recorded by the MAC address recording step; and an IP address recording step of recording the IP address transmitted from the one mesh portal as a result of the request.

The wireless communication method may further include steps and/or operations that perform any of the functions they may be performed by the above-described wireless communication device.

Additionally, according to the present disclosure a non-transitory computer readable recording medium may be provided that includes a computer program that, when executed on one or more computer processors, causes the one or more processors to perform the operations of the above-described wireless communication method and/or the wireless communication device.

DETAILED DESCRIPTION

Various embodiments of the present disclosure will hereinafter be described with reference to the accompanying drawings.

Figure 1:
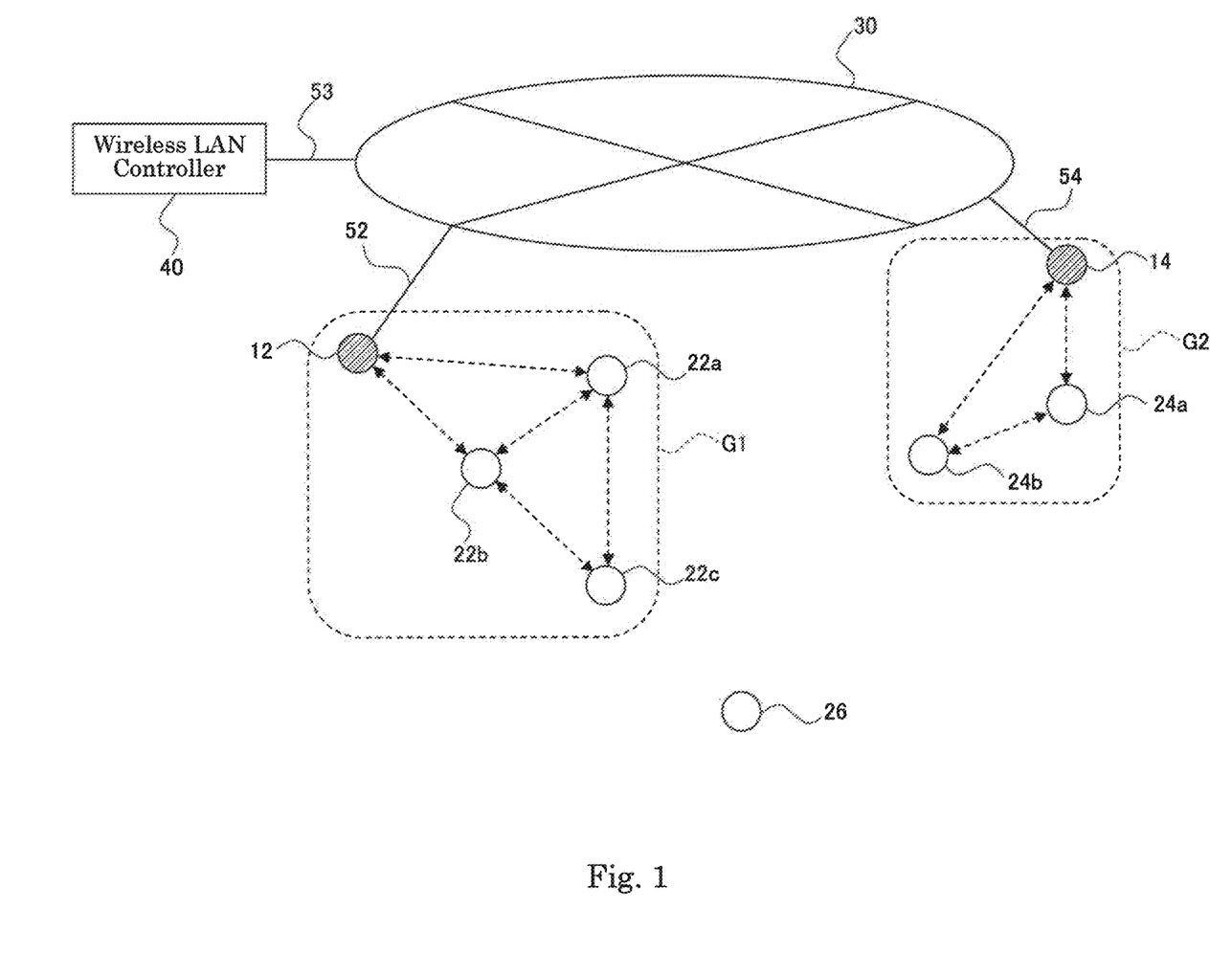
FIG. 1 shows the configuration of a communication network in which a wireless communication device 26 according to an embodiment of the present disclosure is used.

FIG. 1 shows the configuration of a communication network in which a wireless communication device 26, according to an embodiment of the present disclosure, is used.

The communication network, according to an embodiment of the present disclosure, comprises mesh portals (MPPs) 12, 14, mesh access points (MAPs) 22a, 22b, 22c, 24a, 24b, a wireless communication device 26, a wired network 30, a wireless LAN controller 40, and communication cables 52, 53, 54.

The mesh portals (MPPs: Mesh Portal Points) 12, 14 are implemented with a gateway function for connecting an external network (wired network 30 in this embodiment) to mesh points (implemented with a wireless LAN mesh network function) in wireless LAN mesh network communications conforming to the IEEE 802.11s standard.

The mesh access points (MAPs: Mesh Access Points) 22a, 22b, 22c, 24a, 24b are implemented with a wireless LAN access point function at mesh points in wireless LAN mesh network communications conforming to the IEEE 802.11s standard.

The wireless communication device 26 makes wireless LAN mesh network communications, which are wireless communications conforming to the IEEE 802.11s standard, with the mesh portals 12, 14.

The wired network 30 is a wired network (e.g. LAN or the Internet) connected with the mesh portals 12 and 14.

The wireless LAN controller 40 is arranged to control the mesh portals 12, 14, the mesh access points 22a, 22b, 22c, 24a, 24b, and the wireless communication device 26. The wireless LAN controller (which can function as a recording device) 40 is connected with the mesh portals 12, 14 via the wired network 30.

The communication cable 52 connects the mesh portal 12 and the wired network 30. The communication cable 53 connects the wireless LAN controller 40 and the wired network 30. The communication cable 54 connects the mesh portal 14 and the wired network 30.

It is noted that the group G1, G2 are groups in the mesh network. The mesh portals and the mesh access points belonging to each group can make wireless communications via both an open mesh and a closed mesh.

For example, the mesh portal 12 and the mesh access points 22a, 22b, 22c, which belong to the group G1, can make wireless communications via both the open mesh and the closed mesh. Also, the mesh portal 14 and the mesh access points 24a, 24b, which belong to the group G2, can make wireless communications via both the open mesh and the closed mesh.

Figure 2:
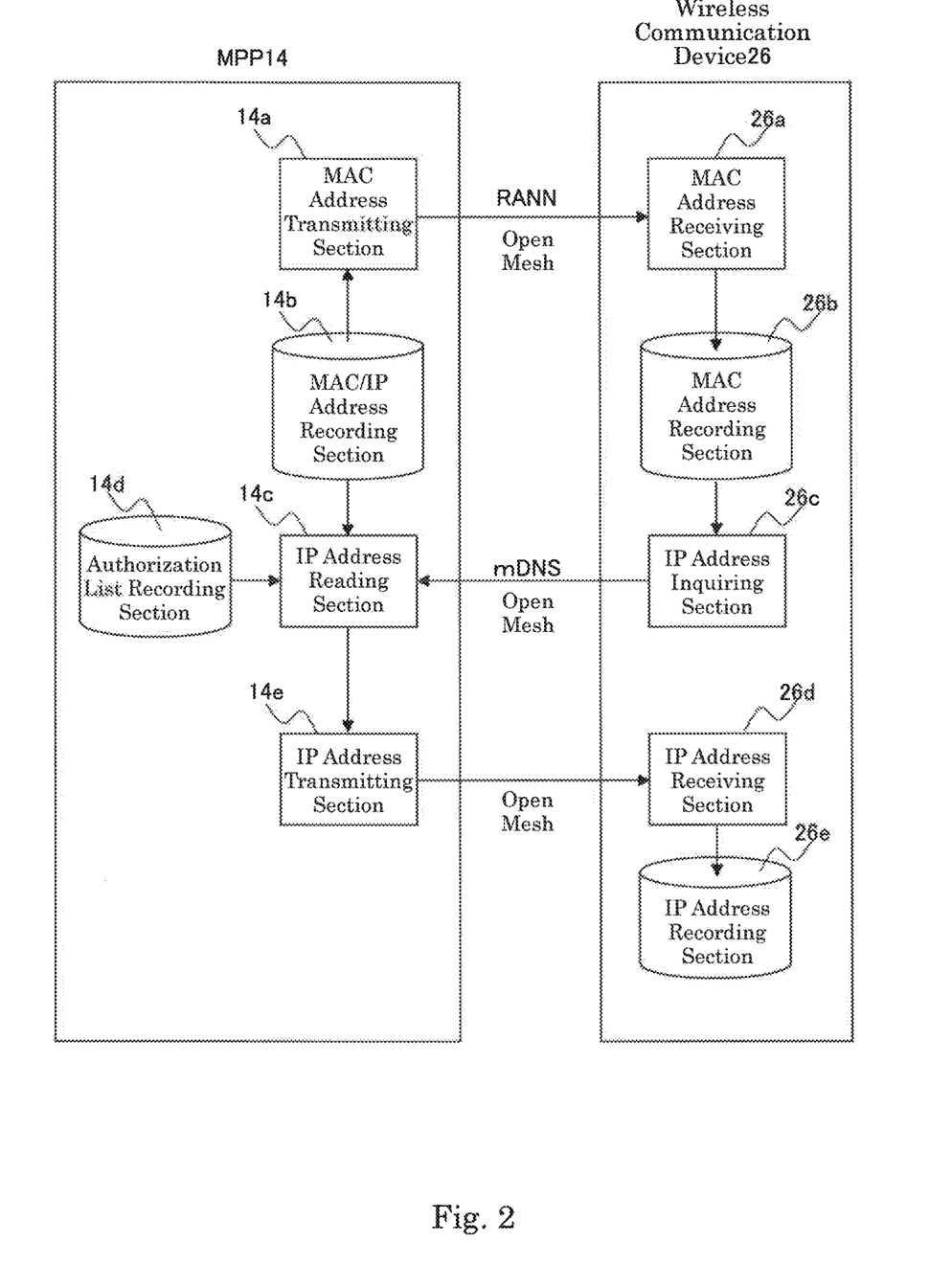
FIG. 2 is a functional block diagram showing the configuration of the wireless communication device 26, according to an embodiment.

FIG. 2 is a functional block diagram showing the configuration of the wireless communication device 26, according to an embodiment. The wireless communication device 26, according to an embodiment comprises a MAC address receiving section 26a, a MAC address recording section 26b, an IP address inquiring section 26c, an IP address receiving section 26d, and an IP address recording section 26e.

It is noted that the mesh portal (MPP) 14 comprises a MAC address transmitting section 14a, a MAC/IP address recording section 14b, an IP address reading section 14c, an authorization list recording section 14d, and an IP address transmitting section 14e. The configuration of the mesh portal 12 is the same as that of the mesh portal 14.

The MAC address receiving section 26a receives the MAC addresses of the mesh portals 12, 14 from the mesh portals 12, 14. It is noted that the MAC address receiving section 26a receives the MAC addresses transmitted from the mesh portals 12, 14 by broadcast RANN. It is noted that the reception is made via the open mesh.

It is noted that the MAC address and the IP address of the mesh portal 14 is recorded by the MAC/IP address recording section 14b of the mesh portal 14. It is noted that the IP address of the mesh portal 14 may be set automatically by, for example, ZeroConf. The MAC address transmitting section 14a reads the MAC address of the mesh portal 14 out of the MAC/IP address recording section 14b and transmits it by broadcast RANN.

Figure 4:
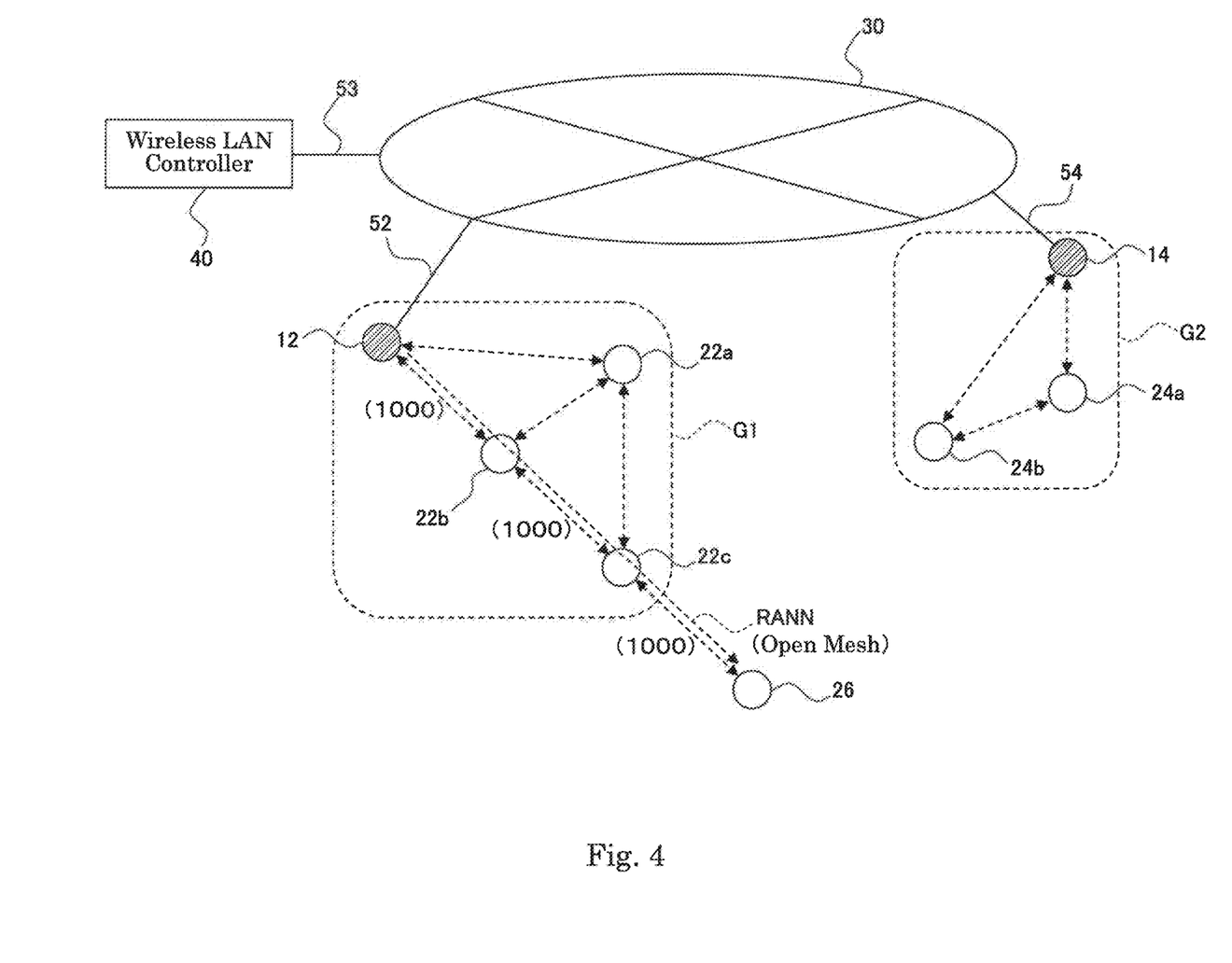
FIG. 4 shows an operation when the wireless communication device 26, according to an embodiment, receives broadcast RANN from a mesh portal 12.
Figure 5:
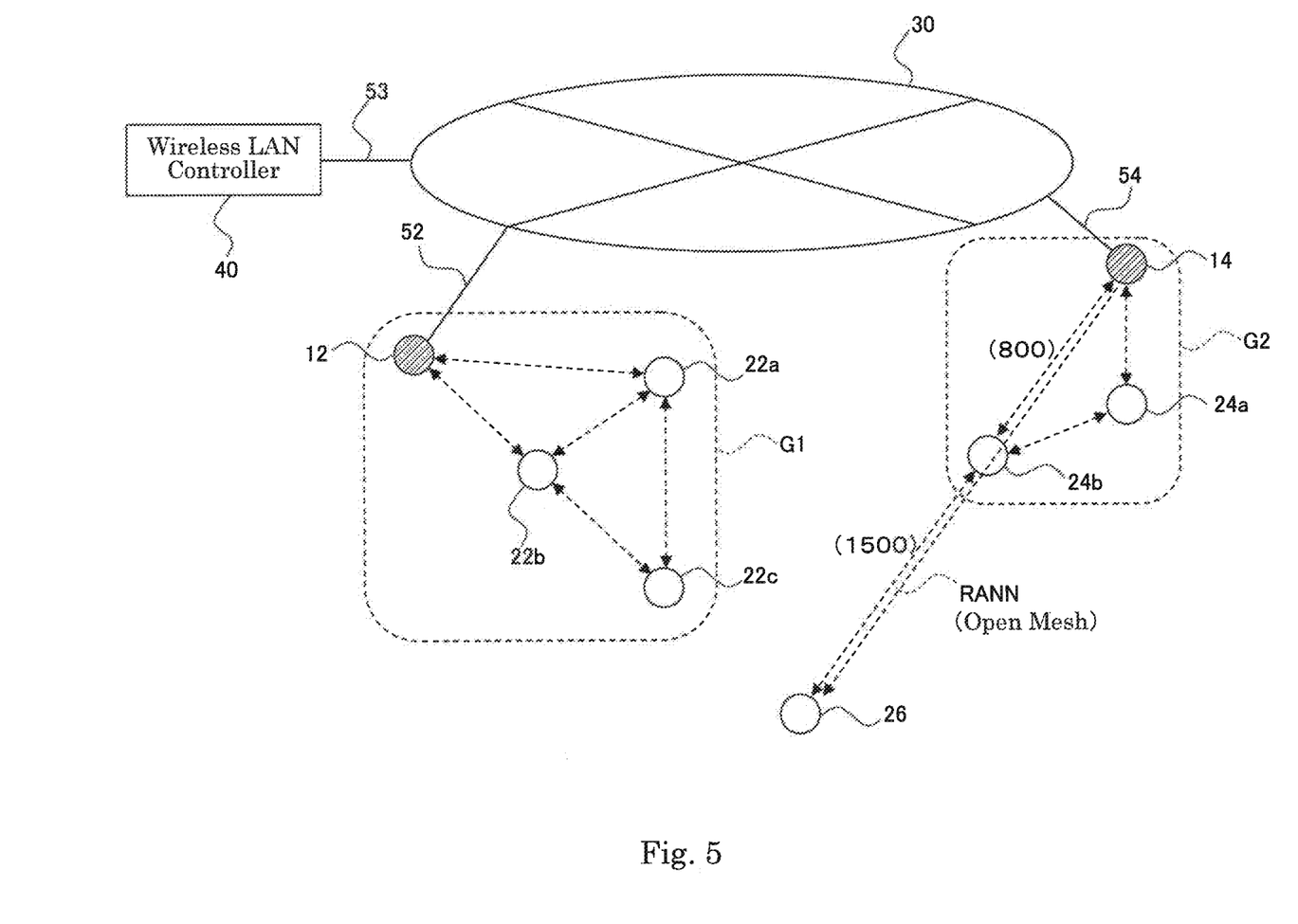
FIG. 5 shows an operation when the wireless communication device 26, according to an embodiment, receives broadcast RANN from a mesh portal 14.

The MAC address recording section 26b records received MAC addresses (see FIG. 6) in correspondence to metrics between the mesh portals 12, 14 and the wireless communication device 26 (see FIGS. 4 and 5).

The IP address inquiring section 26c preferentially requests (inquires) an IP address from one of the mesh portals 12, 14 having a MAC address corresponding to a smaller one of the metrics based on contents recorded by the MAC address recording section 26b. It is noted that the IP address inquiring section 26c can make the request using an mDNS-based IP address inquiry. It is noted that the request can be made via the open mesh.

In an embodiment, the metric between the mesh portal 14 and the wireless communication device 26 is smaller than the metric between the mesh portal 12 and the wireless communication device 26. Accordingly, the IP address inquiring section 26c makes an IP address inquiry for the mesh portal 14. However, for certain reasons (e.g., unless the MAC address of the mesh portal 14 is described in a list recorded by the authorization list recording section 14d), when the mesh portal 14 rejects any inquiry, the IP address inquiring section 26c makes an inquiry to the mesh portal 12.

In response to receiving an IP address inquiry from the IP address inquiring section 26c, the IP address reading section 14c of the mesh portal 14 reads the IP address of the mesh portal 14 out of the MAC/IP address recording section 14b (this, however, can be confined to an inquiry from a communication device that is described in the list recorded by the authorization list recording section 14d). It is noted that identification (e.g. MAC address) of communication devices allowed to make an IP address inquiry is described in the list recorded by the authorization list recording section 14d. This list may be received from the wireless LAN controller 40.

The IP address reading section 14c of the mesh portal 14 provides the read IP address of the mesh portal 14 to the IP address transmitting section 14e. The IP address transmitting section 14e transmits the IP address of the mesh portal 14 via the open mesh to the IP address receiving section 26d.

As a result of inquiry by the IP address inquiring section 26c, the IP address recording section 26e receives and records, from the IP address receiving section 26d, the IP address of the mesh portal 14 transmitted from the mesh portal 14.

Next will be described an operation according to an embodiment.

Figure 3:
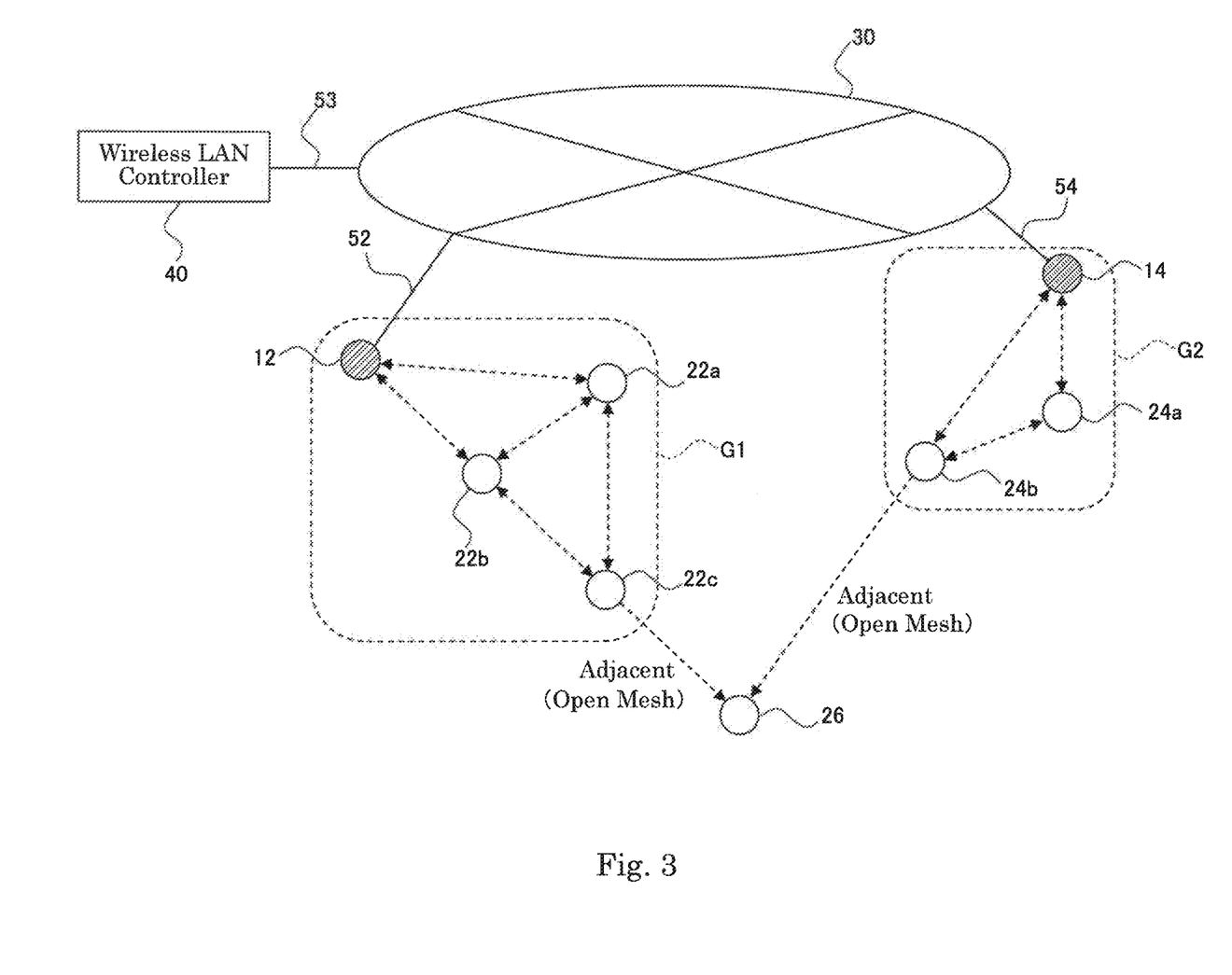
FIG. 3 shows an operation when the wireless communication device 26, according to an embodiment, detects adjacent mesh access points 22c, 24b.

FIG. 3 shows an operation when the wireless communication device 26, according to an embodiment, detects the adjacent mesh access points 22c, 24b. The reference numerals illustrated in FIG. 3 are similar to those illustrated and described with reference to FIG. 1. As such, redundant descriptions thereof are omitted.

Radio waves of a predetermined strength are transmitted from the mesh portals (MPPs) 12, 14 and the mesh access points (MAPs) 22a, 22b, 22c, 24a, 24b. If the wireless communication device 26 can receive these radio waves at a strength equal to or greater than a certain threshold value, the wireless communication device 26 and the mesh portals 12, 14 or the mesh access points 22a, 22b, 22c, 24a, 24b, from which the radio waves are transmitted, are said to be adjacent to each other.

In the example of FIG. 3, since the wireless communication device 26 can receive radio waves at a strength equal to or greater than a certain threshold value from the mesh access points 22c and 24b, it can be detected that the wireless communication device 26 is adjacent to the mesh access points 22c and 24b. It is noted that the reception of radio waves is made via the open mesh.

FIG. 4 shows an operation when the wireless communication device 26, according to an embodiment, receives broadcast RANN from the mesh portal 12. The reference numerals illustrated in FIG. 4 are similar to those illustrated and described with reference to FIGS. 1 and/or 3. As such, redundant descriptions thereof are omitted.

The MAC address receiving section 26a receives the MAC address transmitted from the mesh portal 12 by broadcast RANN. The metric between the mesh portal 12 and the wireless communication device 26 is also measured and recorded by the MAC address recording section 26b in correspondence to the MAC address of the mesh portal 12 (see FIG. 6).

In the example of FIG. 4, the metric between the mesh portal 12 and the wireless communication device 26 is 3000, the sum of the metric (=1000) between the mesh portal 12 and the mesh access point 22b, the metric (=1000) between the mesh access point 22b and the mesh access point 22c, and the metric (=1000) between the mesh access point 22c and the wireless communication device 26.

It is noted that the metric is a well-known concept determined from the communication rate, error rate, and the like. The higher the communication rate, the smaller the metric becomes, while the higher the error rate, the greater the metric becomes. Accordingly, a lower metric value is generally desired because it indicates better communications. An example of a metric is the "Airtime Link Metric" defined in the IEEE 802.11s standard. Other variations of the "Airtime Link Metric" will be understood by those skilled in the art. The metric can take into account frame size of transmission, preamble size and transmission time, header size and transmission time and error rate. A larger error rate will drive the metric calculation upwards and a lower error rate will drive the metric calculation downwards.

FIG. 5 shows an operation when the wireless communication device 26, according to an embodiment, receives broadcast RANN from the mesh portal 14. The reference numerals illustrated in FIG. 5 are similar to those illustrated and described with reference to FIGS. 1, 3 and/or 4. As such, redundant descriptions thereof are omitted.

The MAC address receiving section 26a receives the MAC address transmitted from the mesh portal 14 by broadcast RANN. The metric between the mesh portal 14 and the wireless communication device 26 is also measured and recorded by the MAC address recording section 26b in correspondence to the MAC address of the mesh portal 14 (see FIG. 6).

In the example of FIG. 5, the metric between the mesh portal 14 and the wireless communication device 26 is 2300, the sum of the metric (=800) between the mesh portal 14 and the mesh access point 24b and the metric (=1500) between the mesh access point 24b and the wireless communication device 26.

Figure 6:
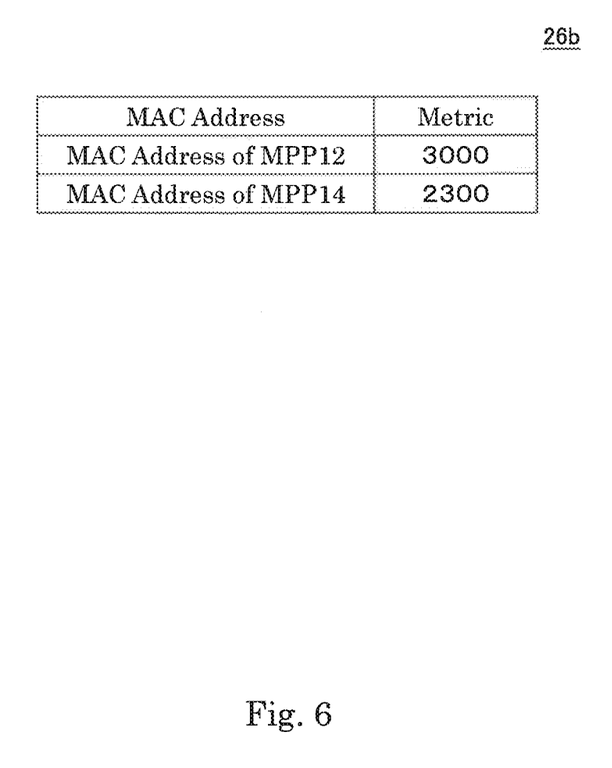
FIG. 6 shows an example of contents recorded by a MAC address recording section 26b, according to an embodiment.

FIG. 6 shows an example of contents recorded by the MAC address recording section 26b, according to an embodiment. The metric corresponding to the MAC address of the mesh portal 14 is smaller than the metric corresponding to the MAC address of the mesh portal 12.

Hence, the IP address inquiring section 26c makes an mDNS-based IP address inquiry/request from the mesh portal 14 and, as a result, the IP address is transmitted from the mesh portal 14. The IP address is received by the IP address receiving section 26d and recorded by the IP address recording section 26e.

The thus acquired IP address and MAC address of the mesh portal 14 can be used for wireless communications between the mesh portal 14 and the wireless communication device 26 via the open mesh.

In accordance with an embodiment, the wireless communication device 26 can be set easily (i.e. automatically) to serve as a mesh point for open-mesh wireless communications.

The wireless communication device 26, according to another embodiment, may differ from other embodiments for open-mesh wireless communications in that the wireless communication device 26 is set for closed-mesh wireless communications.

The configuration of a communication network in which the wireless communication device 26, according to another embodiment of the present disclosure, is similar to that described with reference to FIGS. 1, 2, 3, 4, 5 and/or 6, and no description will be provided therefore.

Figure 7:
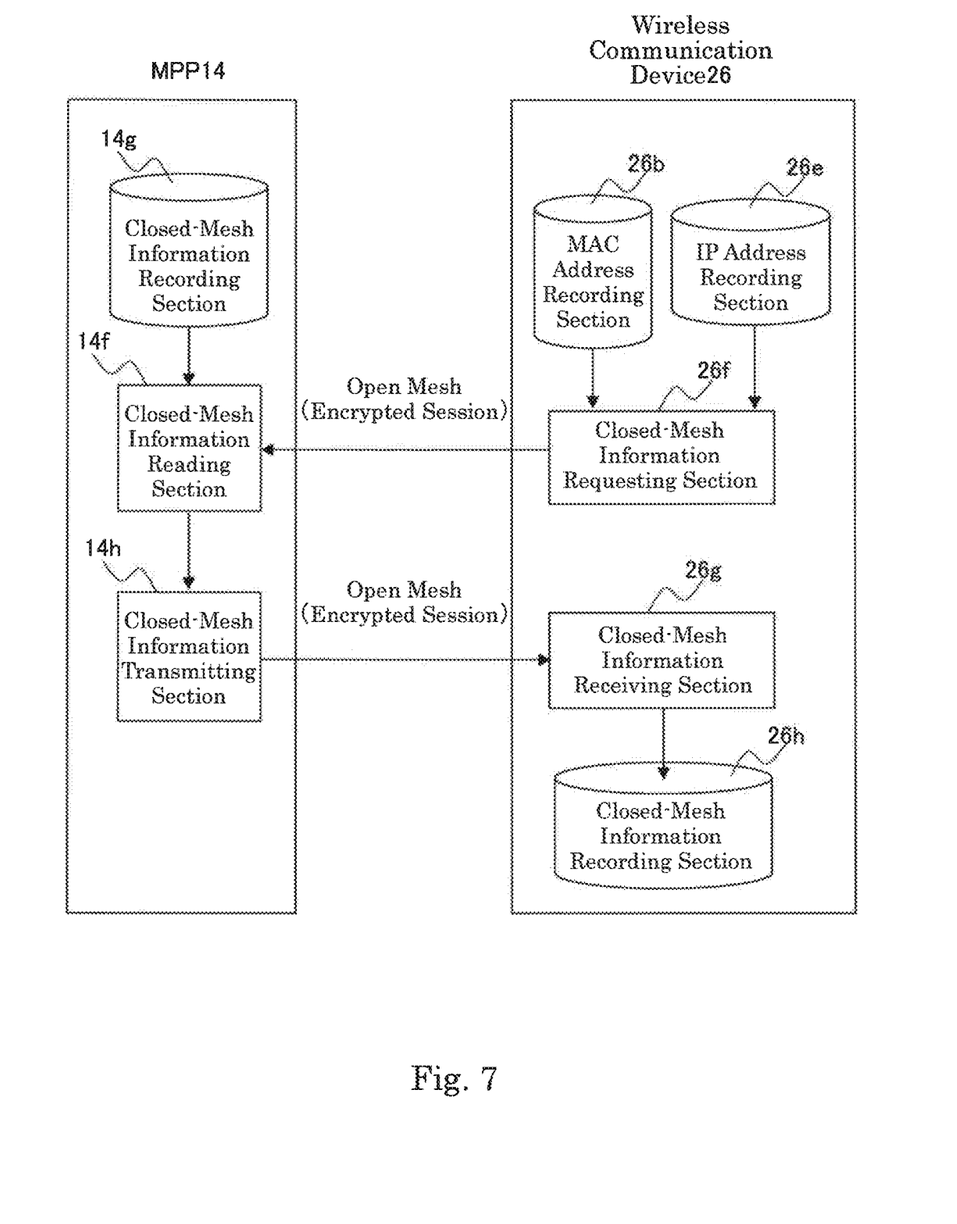
FIG. 7 is a functional block diagram showing a configuration of the wireless communication device 26, according to an embodiment.

FIG. 7 is a functional block diagram showing the configuration of the wireless communication device 26, according to another embodiment. The wireless communication device 26, according to another embodiment, comprises, in addition to the components of the wireless communication device 26, as illustrated in FIGS. 1, 2, 3, 4, 5 and/or 6, a closed-mesh information requesting section 26f, a closed-mesh information receiving section 26g, and a closed-mesh information recording section 26h.

Note that the MAC address receiving section 26a, the IP address inquiring section 26c, and the IP address receiving section 26d are not shown in FIG. 7 for the sake of omitting redundant descriptions, but can be implemented in this embodiment.

Also, the mesh portal 14 comprises, in addition to the components (not shown) of the mesh portal 14 according to an embodiment, a closed-mesh information reading section 14f, a closed-mesh information recording section 14g, and a closed-mesh information transmitting section 14h.

The closed-mesh information requesting section 26f requests information for closed-mesh wireless communications (group ID and password) (note that the IP address and the port number of the wireless LAN controller 40 may further be included) from the mesh portal 14 via the open mesh. The request by the closed-mesh information requesting section 26f is encrypted by the closed-mesh information requesting section 26f The encryption can be based on HTTPS.

It is noted that the closed-mesh information requesting section 26f reads the MAC address of the mesh portal 14 out of the MAC address recording section 26b and the IP address of the mesh portal 14 out of the IP address recording section 26e to transmit a request for the mesh portal 14.

The closed-mesh information reading section 14f of the mesh portal 14 reads information for closed-mesh wireless communications (hereinafter may be referred to as "closed-mesh information") recorded by the closed-mesh information recording section 14g and provides it to the closed-mesh information transmitting section 14h. The closed-mesh information transmitting section 14h encrypts and transmits the closed-mesh information to the wireless communication device 26.

The closed-mesh information receiving section 26g receives the encrypted closed-mesh information (including the encrypted group ID and the encrypted password) from the mesh portal 14 via the open mesh. The closed-mesh information receiving section 26g decodes the encrypted closed-mesh information.

The closed-mesh information recording section 26h receives and records a decoded version of the encrypted closed-mesh information (including the encrypted group ID and the encrypted password) from the closed-mesh information receiving section 26g.

Next will be described an operation according to another embodiment.

As have already been described with reference to FIGS. 1,2, 3, 4, 5 and/or 6, the wireless communication device 26 serves as a mesh point for open-mesh wireless communications.

Figure 8:
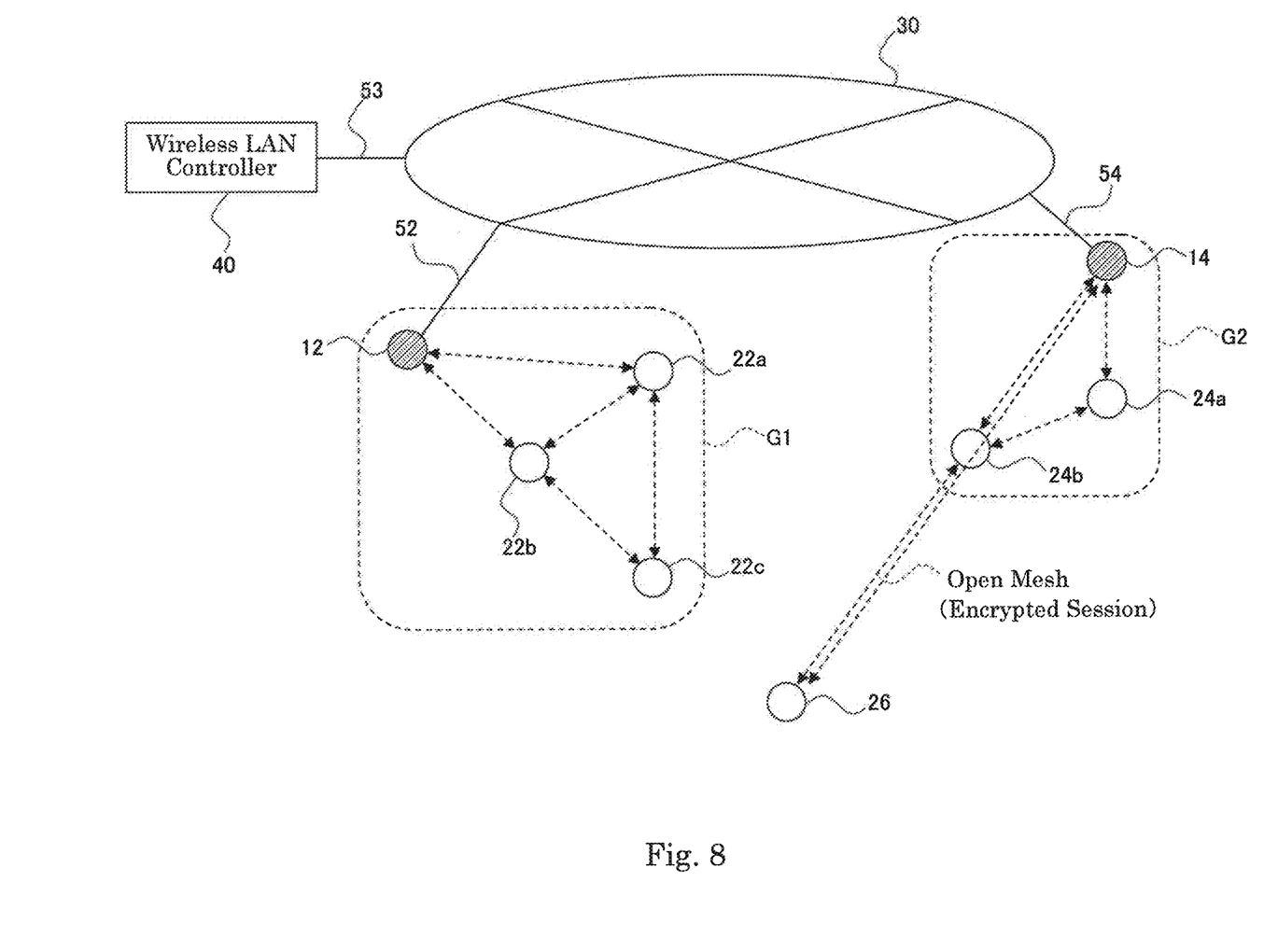
FIG. 8 shows an operation when the wireless communication device 26, according to an embodiment, makes open-mesh (but in encrypted session) communications with the mesh portal 14.

FIG. 8 shows an operation when the wireless communication device 26, according to another embodiment, makes open-mesh (but in encrypted session) communications with the mesh portal 14. The reference numerals illustrated in FIG. 8 are similar to those illustrated and described with reference to FIGS. 1, 3, 4 and/or 5. As such, redundant descriptions thereof are omitted.

When the closed-mesh information requesting section 26f requests closed-mesh information from the mesh portal 14, the closed-mesh information is transmitted from the mesh portal 14 and received by the closed-mesh information receiving section 26g. The closed-mesh information is decoded by the closed-mesh information receiving section 26g and recorded by the closed-mesh information recording section 26h.

It is noted that such communications in an encrypted session can prevent contents such as closed-mesh information from leaking externally.

Figure 9:
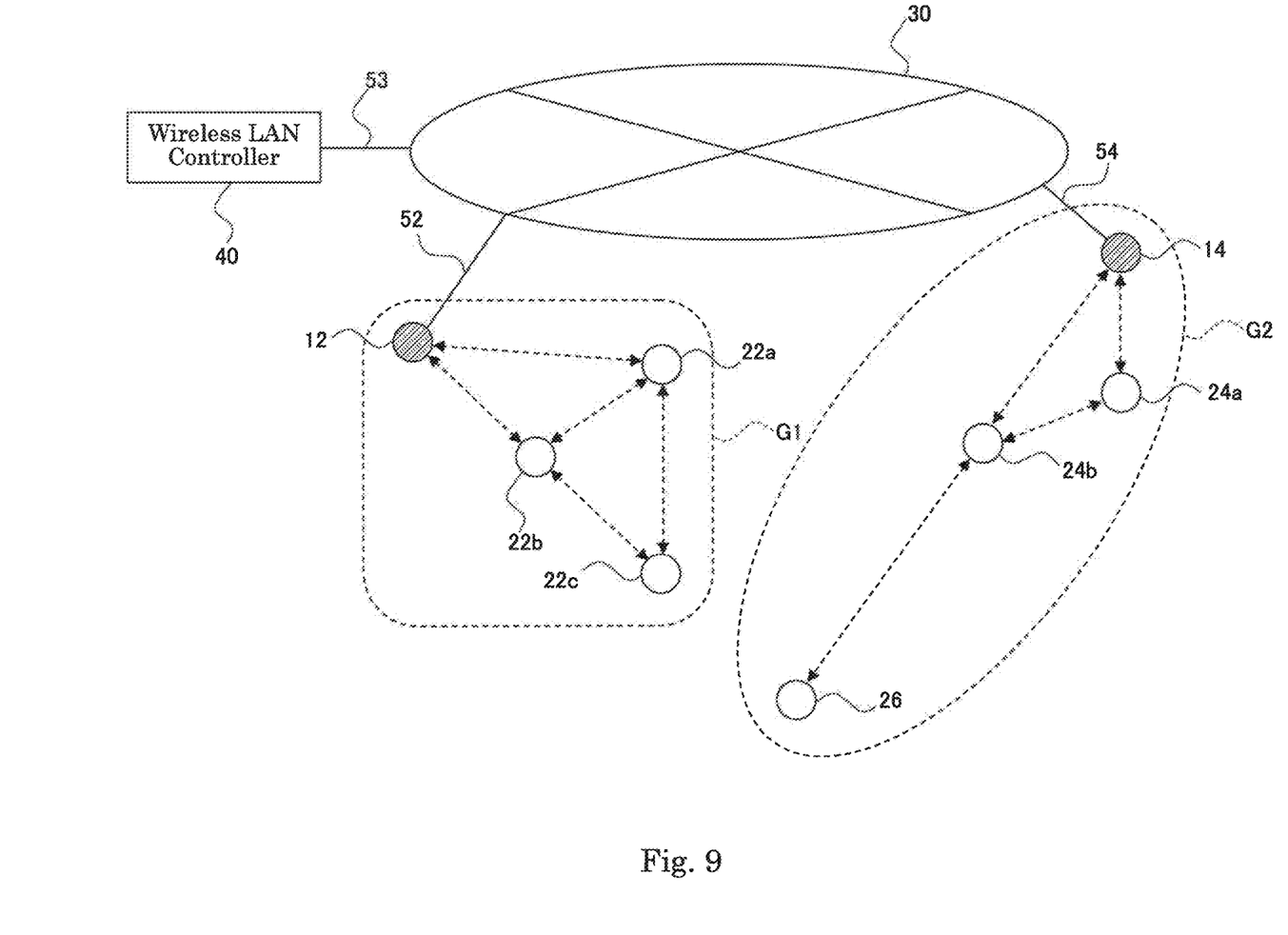
FIG. 9 shows an operation when the wireless communication device 26, according to an embodiment, makes closed-mesh wireless communications with the mesh portal 14.

FIG. 9 shows an operation when the wireless communication device 26, according to another embodiment, makes closed-mesh wireless communications with the mesh portal 14. The reference numerals illustrated in FIG. 9 are similar to those illustrated and described with reference to FIGS. 1, 3, 4, 5 and/or 8. As such, redundant descriptions thereof are omitted.

The closed-mesh information (group ID and password) (note that the IP address and the port number of the wireless LAN controller 40 may further be included) recorded by the closed-mesh information recording section 26h can be used for closed-mesh wireless communications between the mesh portal 14 and the wireless communication device 26.

This causes the wireless communication device 26 to belong to the group G2 and allows for open-mesh and closed-mesh wireless communications with the other communication devices (the mesh portal 14 and the mesh access points 24a, 24b) belonging to the group G2.

In accordance with an embodiment, the wireless communication device 26 can be set easily (i.e. automatically) to serve as a mesh point for closed-mesh wireless communications.

The wireless communication device 26 according to an embodiment in which the wireless communication device 26 serves as a mesh access point differs from other embodiments in which the wireless communication device 26 serves as a mesh point.

The configuration of a communication network in which the wireless communication device 26 according to another embodiment of the present disclosure is similar to that described with reference to FIGS. 1, 2, 3, 4, 5, 6, 7, 8 and/or 9, and no description will be provided therefore.

Figure 10:
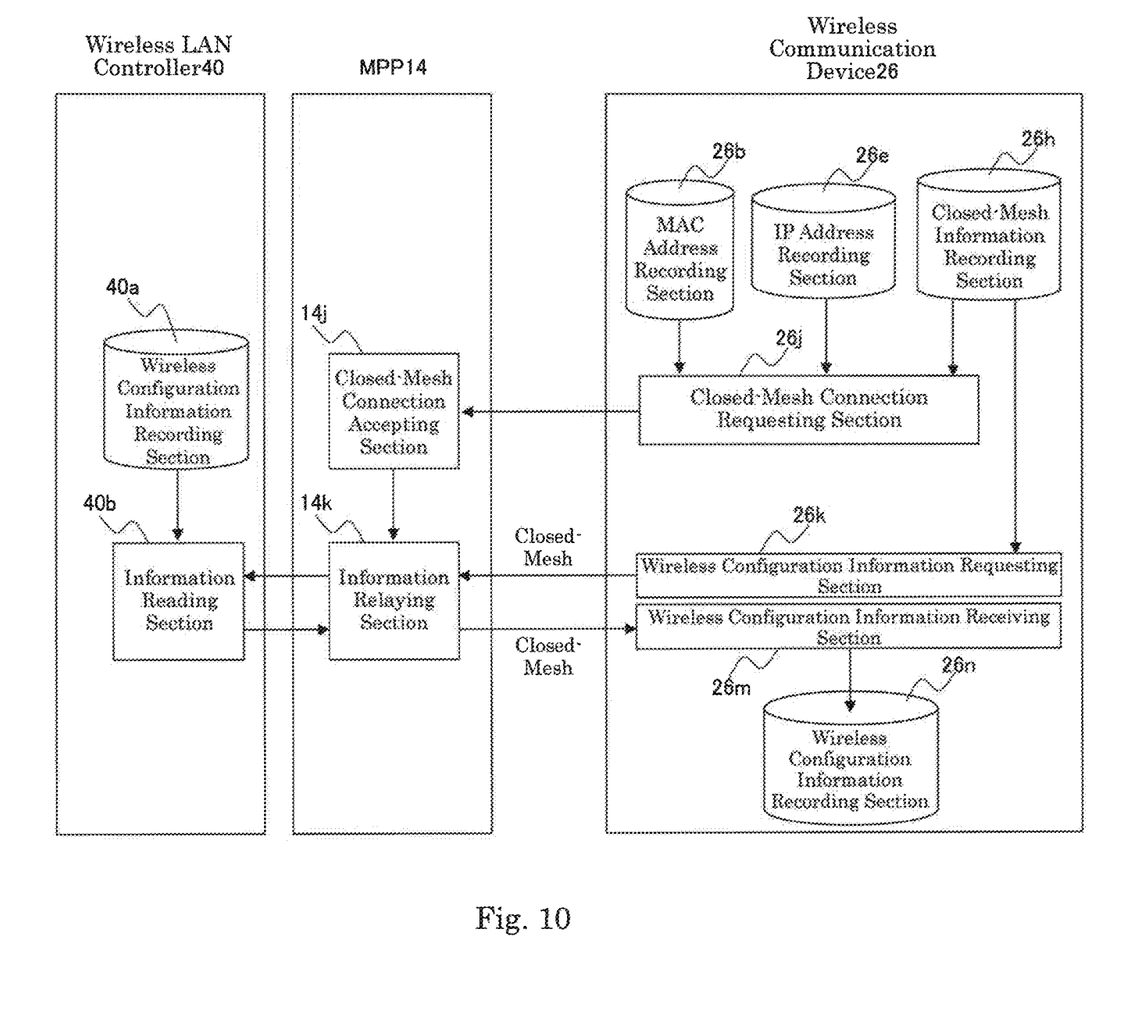
FIG. 10 is a functional block diagram showing the configuration of the wireless communication device 26, according to an embodiment.

FIG. 10 is a functional block diagram showing the configuration of the wireless communication device 26 according to another embodiment. The wireless communication device 26 comprises, in addition to the components of the wireless communication device 26 discussed above with reference to reference to FIGS. 1, 2, 3, 4, 5, 6, 7, 8 and/or 9, a closed-mesh connection requesting section 26j, a wireless configuration information requesting section 26k, a wireless configuration information receiving section 26m, and a wireless configuration information recording section 26n. Note that the MAC address receiving section 26a, the IP address inquiring section 26c, the IP address receiving section 26d, the closed-mesh information requesting section 26f, and the closed-mesh information receiving section 26g are not shown in FIG. 10 for the sake of omitting redundant descriptions but can be implemented in this embodiment.

Also, the mesh portal 14 comprises, in addition to the components (not shown) of the mesh portal 14 according to other embodiments, a closed-mesh connection accepting section 14j and an information relaying section 14k.

The closed-mesh connection requesting section 26j reads the MAC address of the mesh portal 14 out of the MAC address recording section 26b, the IP address of the mesh portal 14 out of the IP address recording section 26e, and the group ID and the password of the closed mesh out of the closed-mesh information recording section 26h to request a closed-mesh connection for the mesh portal 14.

The closed-mesh connection accepting section 14j of the mesh portal 14 receives and authorizes the closed-mesh connection request from the wireless communication device 26 and informs the information relaying section 14k of the authorization. In response to receiving the authorization, the information relaying section 14k relays communications between the wireless communication device 26 and the wireless LAN controller 40.

The wireless configuration information requesting section 26k reads the IP address and the port number of the wireless LAN controller 40 out of the closed-mesh information recording section 26h and further receives the IP address of the wireless communication device 26 from a DHCP server (not shown) connected to the wired network 30 to request wireless configuration information from the wireless LAN controller 40 via the closed mesh.

The wireless configuration information request is provided via the information relaying section 14k to the wireless LAN controller 40. Note that the wireless configuration information is information required to set the wireless communication device 26 to serve as a mesh access point. The wireless configuration information contains at least identifiers (SSIDs) for wireless LAN access points and may further contain passwords, encryption forms (e.g. AES), available channels, available bands, and signal levels (%).

It is noted that the group ID and the password recorded by the closed-mesh information recording section 26h are used to make closed mesh-based wireless communications (see FIG. 9).

The wireless LAN controller (recording device) 40 comprises a wireless configuration information recording section 40a and an information reading section 40b. The wireless configuration information recording section 40a records wireless configuration information (containing at least identifiers (SSIDs) for wireless LAN access points). In response to reception of a wireless configuration information request from the wireless configuration information requesting section 26k via the information relaying section 14k, the information reading section 40b reads wireless configuration information out of the wireless configuration information recording section 40a and transmits it via the information relaying section 14k to the wireless configuration information receiving section 26m.

The wireless configuration information receiving section (identifier receiving section) 26m receives wireless configuration information (containing at least service set identifiers (SSIDs) for wireless LAN access points) from the wireless LAN controller 40 via the information relaying section 14k and the closed mesh. The received wireless configuration information is recorded by the wireless configuration information recording section 26n.

The wireless communication device 26 uses the wireless configuration information recorded by the wireless configuration information recording section 26n to serve as a mesh access point.

Next will be described an operation according to another embodiment.

As have already been described in other embodiments, the wireless communication device 26 serves as a mesh point for closed-mesh wireless communications.

Figure 11:
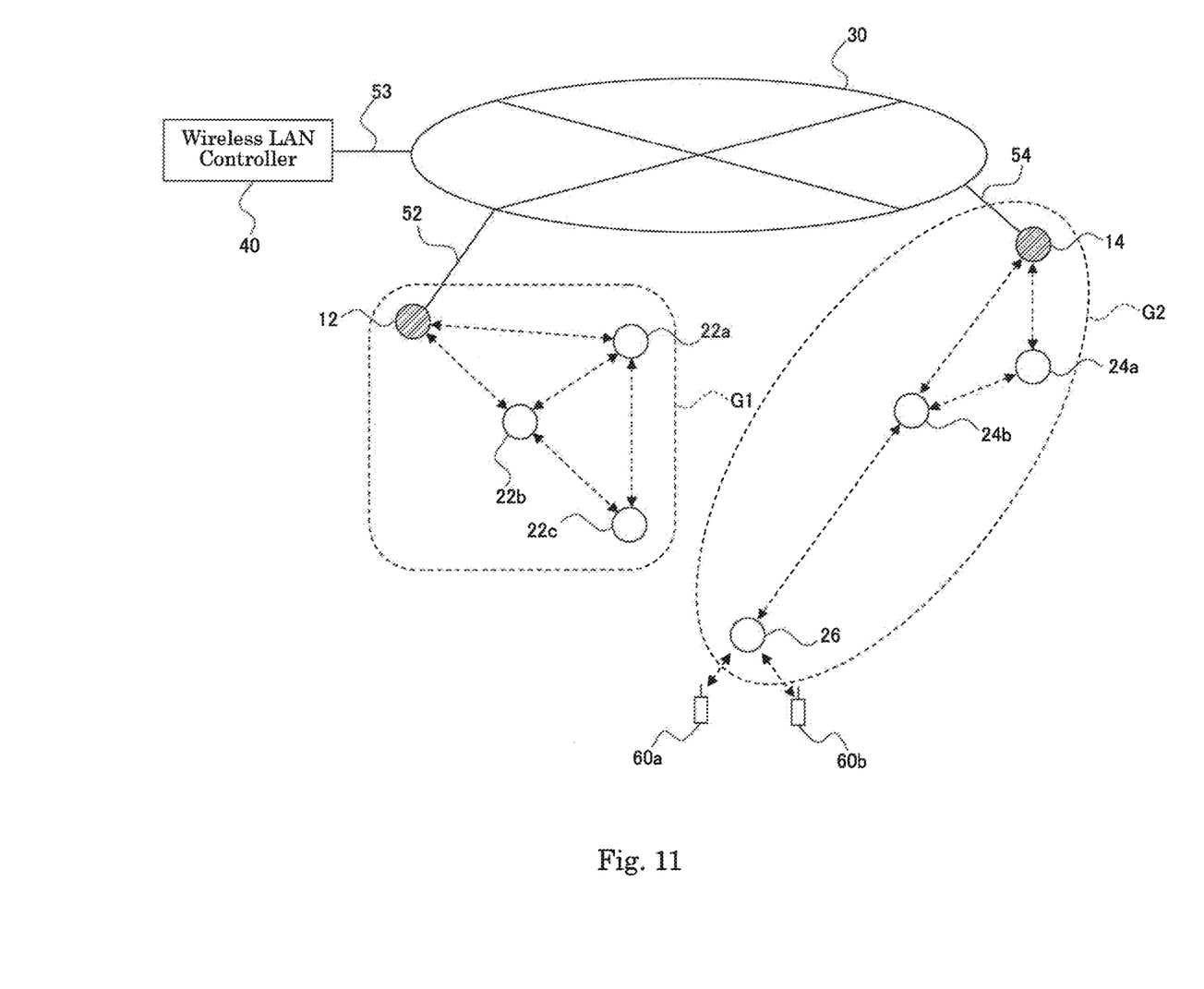
FIG. 11 shows an operation when the wireless communication device 26, according to an embodiment, serves as a mesh access point.

FIG. 11 shows an operation when the wireless communication device 26, according to another embodiment, serves as a mesh access point. The reference numerals illustrated in FIG. 11 are similar to those illustrated and described with reference to FIGS. 1, 3, 4, 5, 8 and/or 9. As such, redundant descriptions thereof are omitted.

The wireless communication device 26 requests wireless configuration information (containing SSIDs) from the wireless LAN controller 40 via the closed mesh, the mesh portal 14, and the wired network 30.

The wireless LAN controller 40 transmits the wireless configuration information (containing SSIDs) via the closed mesh, the mesh portal 14, and the wired network 30 to the wireless communication device 26.

The wireless communication device 26 uses the wireless configuration information recorded by the wireless configuration information recording section 26n to serve as a mesh access point. For example, the wireless communication device 26 can wirelessly communicate with wireless communication terminals (e.g., secure ticket authorities (STAs)) 60a, 60b.

In accordance with another embodiment, the wireless communication device 26 can be set easily (i.e. automatically) to serve as a mesh access point for closed-mesh wireless communications.

The above-described embodiment can also be achieved as follows. A medium (e.g. floppy (registered trademark) disk, CD-ROM) with a program recorded therein that implements the above-described sections (e.g. each section of the wireless communication device 26) is read by a computer including a CPU, a hard disk, and a medium reader and installed in the hard disk. The above-described functions can be achieved, for example, in this manner.

What is claimed is:

1. A wireless communication device that wirelessly communicates with mesh portals in conformity with the institute of electrical and electronic engineers (IEEE) 802.11s standard, the wireless communication device comprising:
    a media access control (MAC) address receiving section that receives, from the mesh portals, MAC addresses of the mesh portals;
    a MAC address recording section that records the received MAC addresses in correspondence to metrics between the mesh portals and the wireless communication device;
    an internet protocol (IP) address inquiring section that preferentially requests an IP address from one mesh portal of the mesh portals having a MAC address corresponding to a smaller one of the metrics based on contents recorded by the MAC address recording section;
    an IP address recording section that records the IP address transmitted from the one mesh portal as a result of the request; and
    an identifier receiving section that receives, from a recording device and via a closed mesh, identifiers of wireless local area network (LAN) access points recorded by the recording device,
    wherein the recording device is connected with the mesh portals via a wired network, and
    wherein a group ID and a password received from a mesh portal of the mesh portals are used for wireless communications using the closed mesh.

2. The wireless communication device according to claim 1, wherein
    the MAC address receiving section receives the MAC addresses transmitted from the mesh portals by a broadcast root announcement (RANN).

3. The wireless communication device according to claim 1, wherein
    the IP address inquiring section makes a multicast domain name system (mDNS)-based inquiry.

4. The wireless communication device according to claim 1, further comprising:
- a closed-mesh information requesting section that requests, via an open mesh, the group ID and the password for closed-mesh wireless communications from the mesh portal of the mesh portals;
- a closed-mesh information receiving section that receives, via the open mesh, an encrypted version of the group ID and an encrypted version of the password from the mesh portal from which the group ID and the password were requested; and
- a closed-mesh information recording section that records a decoded version of the encrypted group ID and the encrypted password, wherein
- the request by the closed-mesh information requesting section is encrypted.

5. The wireless communication device according to claim 4, wherein
- the encryption is based on hyper-text transfer protocol secure (HTTPS).

6. A wireless communication method of using a wireless communication device that wirelessly communicates with mesh portals in conformity with the institute of electrical and electronic engineers (IEEE) 802.11s standard, the wireless communication method comprising:
- receiving media access control (MAC) addresses of the mesh portals from the mesh portals;
- recording the received MAC addresses in correspondence to metrics between the mesh portals and the wireless communication device;
- preferentially requesting an internet protocol (IP) address from one mesh portal of the mesh portals having a MAC address corresponding to a smaller one of the metrics based on contents recorded by the recording of the received MAC addresses;
- recording the IP address transmitted from the one mesh portal as a result of the request; and
- receiving, from a recording device and via a closed mesh, identifiers of wireless local area network (LAN) access points recorded by the recording device,
- wherein the recording device is connected with the mesh portals via a wired network, and
- wherein a group ID and a password received from a mesh portal of the mesh portals are used for wireless communications using the closed mesh.

7. The wireless communication method according to claim 6, wherein
- the receiving of the MAC addresses further includes receiving the MAC addresses transmitted from the mesh portals by a broadcast root announcement (RANN).

8. The wireless communication method according to claim 6, wherein
- the preferential requesting of the IP address further includes making a multicast domain name system (mDNS)-based inquiry.

9. The wireless communication method according to claim 6, further comprising:
- requesting, via an open mesh, the group ID and the password for closed-mesh wireless communications from the mesh portal of the mesh portals;
- receiving, via the open mesh, an encrypted version of the group ID and an encrypted version of the password from the mesh portal from which the group ID and the password were requested; and
- recording a decoded version of the encrypted group ID and the encrypted password, wherein
- the requesting of the group ID and password is encrypted.

10. The wireless communication method according to claim 9, wherein
- the encryption is based on hyper-text transfer protocol secure (HTTPS).

11. A non-transitory computer-readable recording medium having a computer program recorded thereon, the computer program, when executed by one or more processors, causes the one or more processors to perform a method comprising:
- receiving media access control (MAC) addresses of mesh portals from the mesh portals;
- recording the received MAC addresses in correspondence to metrics between the mesh portals and a wireless communication device;
- preferentially requesting an internet protocol (IP) address from one mesh portal of the mesh portals having a MAC address corresponding to a smaller one of the metrics based on contents recorded by the recording of the received MAC addresses;
- recording the IP address transmitted from the one mesh portal as a result of the request; and
- receiving, from a recording device and via a closed mesh, identifiers of wireless local area network (LAN) access points recorded by the recording device,
- wherein the recording device is connected with the mesh portals via a wired network, and
- wherein a group ID and a password received from a mesh portal of the mesh portals are used for wireless communications using the closed mesh.

* * * * *